United States Patent [19]
McAlister

[11] 3,919,996
[45] Nov. 18, 1975

[54] REPEATING SELF PROJECTING BAND TYPE APPARATUS

[76] Inventor: Edgar O. McAlister, 9810 E. Broadway, Tucson, Ariz. 85710

[22] Filed: May 22, 1974

[21] Appl. No.: 472,129

[52] U.S. Cl. ......... 124/19; 273/DIG. 16; 124/30 R; 124/35
[51] Int. Cl.² ........................................... F41B 7/02
[58] Field of Search ......... 124/19, 26, 27, 30 R, 28, 124/29, 35, 34, 41; 273/DIG. 9

[56] References Cited
UNITED STATES PATENTS

| | | | |
|---|---|---|---|
| 2,573,142 | 10/1951 | Herring | 124/19 |
| 2,697,425 | 12/1954 | McElveen | 124/19 |
| 3,812,833 | 5/1974 | Skillern | 124/19 |

Primary Examiner—Richard C. Pinkham
Assistant Examiner—William R. Browne
Attorney, Agent, or Firm—H. Gordon Shields

[57] ABSTRACT

Rubber gun apparatus is disclosed which shoots a plurality of rubber bands, or the like, from consecutive pulls of a trigger using a sliding bolt movable by trigger movement to release pivoting studs to which the rubber bands are affixed. The sliding bolt is unbiased and is manually movable to the rear of the apparatus. This movement causes the sliding bolt to disengage the studs and cause them to pivot downwardly to a rubber band releasing position.

11 Claims, 5 Drawing Figures

U.S. Patent Nov. 18, 1975 3,919,996
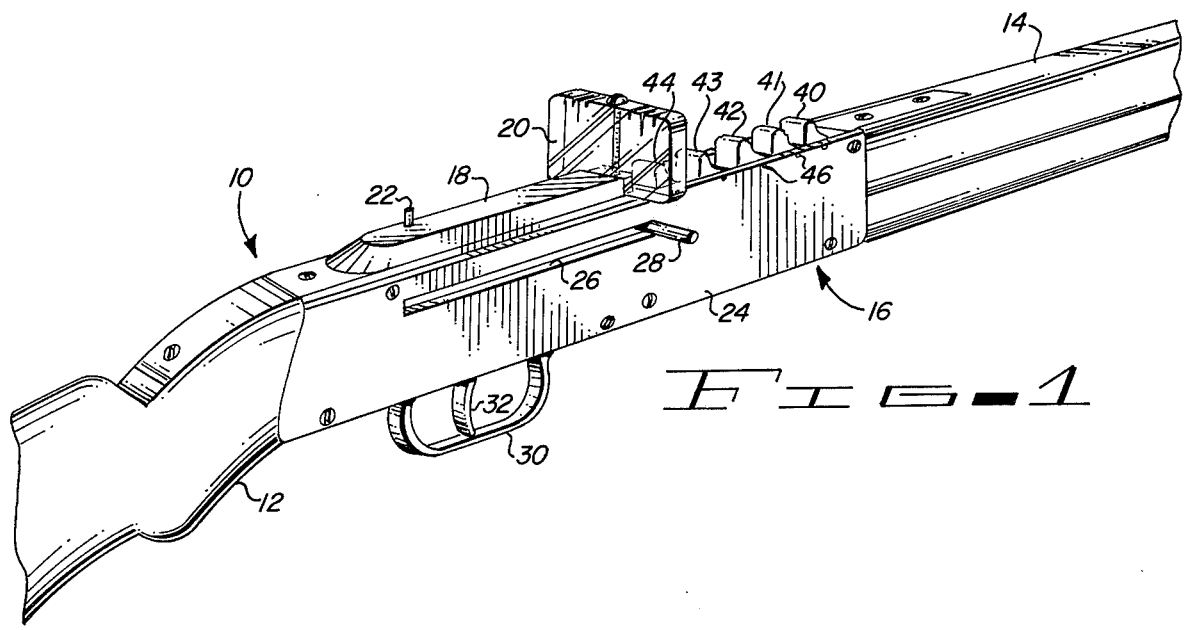

REPEATING SELF PROJECTING BAND TYPE APPARATUS

BACKGROUND OF THE INVENTION

1. Field of the Invention

This invention relates to rubber guns and, more particularly, to rubber guns in which a plurality of rubber bands are released or are shot by consecutive pulls of a trigger.

2. Description of the Prior Art

Rubber guns have been standard toys for young people for many years. With the invention or development of appropriate rubber, such as rubber bands and rubber tires, the development of a toy to utilize rubber bands or sections from rubber tires was an inevitable consequence of young people's urge for competitive and action type games. Most rubber guns simply include a form of some type around which, or over which, a rubber member was stretched and held, and means for holding and releasing the rubber member. Such type of rubber guns were usually limited to a single shot. The typical means for holding and releasing the rubber band on such single shot guns was very often a clothespin. The clothespin was fastened to the form or frame, and the rubber band or section from an inner tube was looped around the form and held between the jaws of a clothespin. Generally the normal compressive force exerted by one jaw of a clothespin against the other jaw by a spring was sufficient to hold the rubber between the jaws of the clothespin. However, if additional force were needed, such force was generally applied by another rubber band or the like to the clothespin between the pivot point of the clothespin and the jaw. The pivot point of the clothespin is defined as the point at which the clothespin moves or pivots to open or to close its jaws.

For multiple shot rubber guns, the frame or form usually included provisions for looping a plurality of rubber bands or the like around a common point on the form and then providing a plurality of locations on the form, such as notches, around or in each of which a single rubber band was located. The release of the rubber bands, and accordingly the shooting of the rubber gun, was accomplished by manually, and usually mechanically, lifting or moving each rubber band out of its depression or notch to release the rubber band for each individual shot.

The present invention contemplates a sequential release of a plurality of rubber bands by successive pulls of trigger mechanism.

SUMMARY OF THE INVENTION

This invention comprises apparatus for sequentially releasing a plurality of rubber bands by consecutive pulls of a trigger. A trigger is movable to actuate or move a slidable bolt beneath a plurality of rotating studs. As the bolt is moved from beneath a stud, the stud pivots against the pressure of the rubber band. Successive pulls release successively the rotary studs and the rubber bands affixed thereto. When all rubber bands have been shot or released, the bolt is manually returned to its beginning position and the movement of the bolt causes the rotary studs to return to their upright or erect positions, and thus ready for continued loading and shooting.

Among the objects of the present invention are the following:

To provide new and useful rubber gun apparatus;

To provide new and useful apparatus for shooting consecutively a plurality of rubber bands and the like;

To provide new and useful apparatus for shooting rubber bands and the like with consecutive pulls of a trigger;

To provide new and useful rubber gun apparatus having a slidable bolt movable by a trigger;

To provide new and useful rubber gun apparatus having pivoting studs for releasing rubber bands and the like; and To provide new and useful apparatus for consecutively releasing a plurality of rubber bands or the like by consecutive movement of trigger apparatus which moves a sliding bolt to release pivoting studs to which the rubber bands, or the like, are secured.

BRIEF DESCRIPTION OF THE DRAWING

FIG. 1 is an isometric view of a portion of apparatus embodying the present invention.

FIG. 2 is a side view of a portion of the apparatus of FIG. 1.

FIG. 3 is a side view, in partial section and partially cut away, illustrating features of the present invention.

FIG. 4 is a view in partial section taken generally along line 4—4 of FIG. 3.

FIG. 5 is a broken view of a portion of the apparatus of FIGS. 1–3.

DESCRIPTION OF THE PREFERRED EMBODIMENT

FIG. 1 is an isometric view of a portion of a rubber gun apparatus 10 embodying the present invention. The rubber gun apparatus 10 includes three main parts, a stock 12, a barrel 14, and a receiver 16, the latter of which includes the movable or working parts of the apparatus.

A pedestal 18 is disposed on the top of the receiver and to the rear of the receiver adjacent the stock. At the forward or front portion of the pedestal 18 is an eye shield 20 extending upwardly with respect to the pedestal and also extending across the pedestal and slightly beyond the receiver. The eye shield is generally rectangular in configuration, with rounded corners, and is made of a transparent substance, such as methyl methacrylate, commonly known as "Plexiglas," or some other plastic material. The eye shield protects the eyes of the user in case of a malfunction of one of the rubber bands which the apparatus shoots.

A sighting post 22 is disposed on top of the pedestal rearwardly and adjacent the stock 12. Thus by sighting along the sighting post and through the eye shield, the user of the apparatus will be able to aim the rubber gun and at the same time his eyes will be disposed within the protected area of the eye shield 20.

The receiver includes a side plate 24 which extends from the stock 12 to the barrel 14. A slot 26 extends through the side plate 24 and is disposed axially of the gun. A bolt pin 28 is movable in the slot and extends outwardly from the slot. The bolt pin is connected to the bolt mechanism within the receiver and will be discussed in detail below. The bolt pin moves rearwardly, or from the position shown in FIG. 1 along the slot 26 to a rear position adjacent the stock 12. It is moved or returned manually to move the bolt to the forward position.

A trigger guard 30 is disposed beneath the receiver adjacent the stock. A trigger 32 extends from beneath the receiver within the trigger guard and is movable in a trigger slot 34 in the receiver.

On top of the receiver 16, and located forward, or in front, of the eye shield 20, are five pivoting studs 40, 41, 42, 43, and 44. Each of the studs pivots on a pin 46 which extends laterally, with respect to the longitudinal axis of the gun, through the receiver adjacent the top of the side plates. The pins 46 are shown extending through side plate 24 adjacent the top thereof. While each stud has been given a different reference numeral, the pins on which the studs pivot have been given a common reference numeral in order to simplify the explanation.

A plurality of appropriate fastening devices, such as screws and bolts and nuts are illustrated in the figures, and will not be specifically referred to. It is obvious that such fastening means are required to hold the various parts of the rubber gun apparatus 10 together. Accordingly, no further explanation will be forthcoming concerning them.

FIG. 2 is a side view of a portion of the apparatus of FIG. 1, showing the full length of the barrel 14 and a portion of the receiver 24. Each of the studs 40, 41, 42, 43, and 44 is shown in an upright or erect position extending substantially vertically above the receiver 24. The barrel 14 includes a notch 15 at the fore end thereof. The notch is used to secure a plurality of rubber bands 49, one of which is disposed about each of the vertically extending studs 40 . . . 44.

The studs 40 . . . 44 pivot on their pivot pins 46, which extend through the side plates, including side plate 24, of the receiver 16. Each of the studs 40 . . . 44 includes a limit pin 48 disposed immediately behind the respective studs and also extending through the side plates of the receiver. The limit pins are shown disposed immediately adjacent the top of the receiver. Since the studs pivot on the pins 46, the limit pins 48 limit the rearward movement of the studs and hold them in the erect position shown in FIGS. 1 and 2. A plurality of rubber bands 49 extend from the notch 15 to the studs 40 . . . 44. One of the rubber bands extends from the notch to each of the studs. Since the release or shooting of the rubber bands will be from stud 40 first, then from stud 41, and so forth until the rubber band secured to stud 44 is released, the loading of the rubber bands must be accomplished in reverse order. Thus the rubber band first secured to the apparatus will extend from the notch 15 to stud 44. The second rubber band will extend from notch 15 to stud 43, and so on until the fifth rubber band is secured between the notch 15 and stud 40.

FIG. 3 is a side view of rubber gun apparatus 10, particularly illustrating the operation of the trigger mechanism within receiver 16. The figure is in partial section and is partially broken away to illustrate the operation and cooperation of the respective portions of the apparatus.

The receiver 16 is shown partially broken away to disclose the trigger mechanism located within the receiver. Pedestal 18 is shown surmounting the receiver, with eye shield 20 disposed at the forward portion of the pedestal and the sighting post 22 disposed toward the rear of the pedestal. In front of the pedestal and eye shield 20 are shown the five studs 40, 41, 42, 43, and 44. Slot 26 is also shown extending through the side plate 24 of the receiver and bolt pin 28 is shown extending through the slot 26. The bolt pin 28 is also shown in phantom in successive positions from its forward position rearwardly. The positions shown in phantom represent the movement of the bolt pin as it moves in response to successive pulls of the trigger 32. The trigger 32 is shown extending beneath the receiver 16 and within trigger guard 30.

Each of the studs 40 . . . 44 pivots on a pivot pin 46 which extends through both sides of the receivers. Immediately behind or rearwardly of each stud is a limit pin 48 which also extends between the sides of the receiver. The limit pins limit the movement of the studs rearwardly and keep them aligned vertically in the proper position to receive the rubber bands.

Each of the studs 40 . . . 44 includes a pair of arms, generally disposed at right angles to each other. A rubber holding arm 50 extends upwardly with respect to the receiver and is held in such upwardly extending position by the limit pin 48 disposed immediately rearwardly of the arm. Extending generally perpendicularly to the arm 50 is a roller arm 52. The roller arm 52 terminates in a roller 54 secured thereto. Each roller is oriented substantially parallel to the limit pins 48 and to the pivot pins 46. The pivot pins 46 extend through the studs in the roller arm portion of each stud.

A sliding bolt 60 is disposed within the receiver directly beneath the studs. When the studs are in the upright position, with the arms 50 extending upwardly to receive a rubber band, the rollers 54 of each stud are disposed on the sliding bolt 60. The sliding bolt moves rearwardly in response to movement of the trigger 32. As the bolt moves, the movement withdraws the bolt from beneath each stud in succession. The limit of travel of the trigger 32 is coordinated or correlated with the distance which the bolt 60 must move in order to release a stud with each pull of the trigger. Each time the trigger 32 is moved rearwardly, the bolt 60 moves from beneath a stud substantially the same distance the trigger is moved, which is the distance required to free a stud and accordingly allows the stud to pivot on pivot pin 46 in response to the compressive pull of a rubber band which is disposed around the upwardly extending arm 50 between the stud and the notch 15 of the barrel 14 (see FIG. 2). Bolt pin 28 is secured to the rearward portion of sliding bolt 60. As stated above, as the sliding bolt moves rearwardly in response to movement of trigger 32, the bolt pin also moves rearwardly through the slot 26. The successive locations of bolt pin 28 in response to trigger movement is shown in phantom. When the bolt has been moved rearwardly sufficient to release the rubber bands from all of the studs, the bolt 60 is returned to the forward position shown in FIG. 3 by manually advancing the bolt pin 28.

Bolt 60 includes a rounded nose 62 at the forward end of the bolts. When a stud pivots on its pivot pin 46 in response to the retraction of the bolt from beneath the stud and the forward urging of the rubber band against the arm 50 of the stud, the stud pivots sufficiently such that arm 50 is disposed generally parallel to the axis of the rifle and to the barrel 14 thereof, which in turn renders the roller arm 52 substantially perpendicular to the axis of the gun and to the barrel 14. The roller arm 52 thus moves downwardly and rearwardly. As the bolt 60 is moved forward, the rounded nose 62 of the bolt contacts the roller arm 52 and the roller 54 and pivots the stud upwardly on the pivot pin 46 until the arm 50 is substantially upwardly extending, perpendicular to the barrel and against the limit pin 48.

Disposed above the trigger 32 is a trigger housing 70. The housing includes a trigger slot 72 through which the trigger extends and in which the trigger is movable. The trigger 32 is movable in the trigger housing 70 on a trigger pin 74 which extends through the trigger and is supported by the trigger housing 70 on each side of the trigger slot 72. Beneath the trigger pin 74, but still within the receiver is a tension spring 76 secured to the trigger and to a fixed portion of the receiver. The spring is a return spring for returning the trigger to its forward position after it has been moved rearwardly under the pressure of the user of the gun in firing a rubber band.

A flexible strap 64 is secured to the bolt 60 adjacent the nose 62 of the bolt and extends from the bolt through the trigger housing 70. Movement of the strap results in a corresponding movement of the bolt. The trigger 32 includes a tang or spur 78 extending upwardly and rearwardly from the trigger pin 74. When the trigger 32 is moved rearwardly under finger pressure of a user, the trigger pivots about pin 74 which extends across the slot 72 of the trigger housing 70. The pivoting of the trigger is accomplished by the pressure of the user against the trigger 32 in opposition to the bias of tension spring 76. The force of the spring is exerted between the trigger pin 74, which is the pivot point for the trigger, and the location on the trigger at which the finger pressure or force of the user is applied. The spring 76 is disposed closer to the trigger pin 74 than to the position or location on the trigger at which such finger pressure is applied. As the trigger pivots, the tang 78 is moved upwardly against the strap 64 and biases the strap against the trigger housing 70. Accordingly, as the trigger is moved rearwardly, the strap 64 moves backwardly with the trigger under the continued bias of the tang 78. In this manner, the bolt 60 is moved rearwardly from beneath each of the studs in sequence. The length of the trigger slot 34 in the receiver is the correct or proper length to allow the bolt to move from beneath one stud with one pull of the trigger. That is, the length of the trigger slot 34 is substantially the same as the distance from one stud to the next adjacent stud. Thus when the trigger is moved rearwardly, the strap 64, affixed to the bolt 60, is moved a distance equal to the distance from one stud to the next adjacent stud in order to allow a single stud to pivot and thus to release the rubber band affixed thereto.

When the trigger is released from its rearward pull, the bias of spring 76 pulls the trigger forward and the trigger pivots downwardly on the pivot pin 74 to disengage the tang 78 from the strap 64. The trigger moves forward but the strap, and the bolt to which it is affixed, remain in position. With the bolt 62 in the full outward or forward position, which is shown in FIG. 3, the first pull of the trigger 32 in slot 34 will move the bolt 60 from beneath stud 40. With the stud loaded with a rubber band in a tension condition as shown in FIG. 2, the removal of the bolt will allow the stud to pivot on its pivot pin 46 under the compressive force of the rubber band. As the stud pivots, the rubber band will slip off the stud and thus will be fired from the gun. When the trigger is released from its rearward position, shown in phantom in FIG. 3, the tang 78 will pivot away from engagement strap 64 and the trigger 32 will be returned to its forward position in slot 34. However, because of bolt friction by the other loader studs, the strap 64 will remain in position and the bolt will also remain in position.

A second pull on the trigger 32 will again pivot the trigger to engage the tang 78 against the strap 64 and the strap and the bolt will be withdrawn from beneath stud 41. Again, the stud will pivot under the compressive force of the tensioned rubber band affixed thereto as the bolt moves from beneath the arm 52 of the stud, thus allowing the rubber band to slip off the stud and to be fired. Release of the trigger will again cause the trigger to be moved forward under the bias of spring 76 while leaving the strap and the bolt in position beneath studs 42, 43, and 44.

Three more consecutive pulls on the trigger will move the bolt 62 from beneath the three remaining studs, thus firing the rubber bands secured to the studs, by the same procedure described in the preceding paragraph. When the bolt is in its rearward position, illustrated by the successive positions of bolt pin 28 shown in phantom in slot 26 of the receiver, the bolt must be manually returned. The manual return is accomplished as described above by moving the bolt pin 28 forward in the slot 26 to the position shown in FIGS. 1 and 3. Since the bolt 60 is not biased except when the trigger 32 is pivoted to cause the tang 78 to contact strap 64, the bolt is freely slidable beneath the studs. The slot 26 is of sufficient length to allow the bolt to move beneath each one of the studs to permit the studs to pivot, thus releasing the rubber bands affixed to them. The forward end of the slot comprises the forward limit of the length of travel of the bolt and is such as to allow the bolt to fully extend beneath the pivot arm 52 and the roller 54 of stud 40. The five phantom circles in the slot 26 in FIG. 3 illustrate the positions of the bolt pin 28 for the release of each of the studs to fire the rubber bands secured thereto.

FIG. 4 is a view in partial section of the trigger apparatus taken generally along line 4—4 of FIG. 3. The trigger housing 70 comprises a generally rectangular tube including an upper wall 80 and a lower wall 82, and trigger slot 72 extends substantially the length of the housing 70 through the lower wall 82 thereof. The trigger housing 70 is disposed within the receiver 16, between wall 24 and wall 25 of the receiver, and spaced apart slightly from a bottom plate 36 of the receiver 16. The trigger slot 34 extends through the bottom plate 36 and is substantially parallel to the slot 72 in the lower wall 82 of the trigger housing 70.

Trigger 32 extends through the slots 34 and 72 and into the interior of the trigger housing 70. The trigger spur 78 extends upwardly within the trigger housing and, when the trigger is pivoted on trigger pin 74, the spur 78 is moved upwardly against the strap 64. The strap is then biased or held against the upper wall 80 of the trigger housing. The trigger pin 74 extends through the trigger 32 within the trigger housing 70 and is disposed on the lower wall 82 of the housing. The trigger pin extends on either side of the trigger and thus on either side of the slot 72. When the trigger, and thus the tang 78, pivots downwardly on the trigger pin 74, the strap 64 moves downwardly away from the upper wall 80 of the trigger housing 70. However, with the tang 78 biasing the strap against the upper wall 80, the strap moves with the trigger as the trigger moves backwardly (see FIG. 3).

Since the strap must move with the trigger, and since it must also be biased against the trigger housing, it is preferable that the strap be made of a plastic type material, preferably reasonably stiff and yet flexible and also preferably having a plurality of serrations or ridges in it to provide small slot-like protrusions and depressions to assist the tang in securely biasing the strap and moving the strap as the trigger moves.

FIG. 5 is a broken view of a portion of the apparatus of FIGS. 1–3, comprising an enlarged view of a stud. The stud 40 is shown in its upright position, with arm 50 disposed against limit pin 48. The stud pivots on pin 46 which is shown extending through the stud and into side wall 25 of the receiver 16. Roller 54 is shown secured to roller arm 52 of the stud. The bolt 60 extends beneath the roller arm and the roller of the stud, and the stud is thus disposed on the bolt and held in an upright position thereby against the limit pin 48. In the position shown, the stud may receive a rubber band.

If the bolt 60 were to be removed from beneath the roller arm, the stud could pivot about the pivot pin 46, thus causing the roller arm 52 to move downwardly and causing the arm 50 to move downwardly also under a compressive force exerted by a rubber band secured around the arm 50. The roller 54 extends slightly below the arm 52 and thus the bolt 60 contacts the roller 54 as the bolt moves away from the stud and as the bolt moves beneath the stud to erect the stud to the position shown. The nose 62 of the bolt is rounded to allow for smoother engagement and disengagement with the roller 54.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. Obviously, any type of elastic bands or other elastic media could be used with the present apparatus, rather than the rubber bands which are discussed and illustrated. Moreover, if desired, a single elastic member could be shot or released from the gun instead of the plurality of elastic members which are illustrated as being sequentially released or shot. This specification and the appended claims have been prepared in accordance with the applicable patent laws and the rules promulgated under the authority thereof.

What is claimed is:

1. Rubber gun apparatus for shooting a plurality of elastic members, comprising, in combination:
   a stock for holding the apparatus;
   barrel means secured to the stock for holding a portion of each of the plurality of elastic members;
   receiver means secured to the stock and to the barrel means for controlling the shooting of the elastic members from the rubber gun apparatus, including pivotable stud means for holding another portion of each of the plurality of the elastic members in tension condition, said stud means comprising a plurality of studs positioned generally along the longitudinal axis of the barrel means,
   movable means adjacent the stud means for controlling the movement of each of the stud means to sequentially release an elastic member, said movable means being unbiased and slidably mounted, and
   trigger means for controlling the movement of the movable means and movable to engage the movable means and to cause the movable means to move rearwardly to disengage successive studs and thereby permit pivoting of said studs.

2. The apparatus of claim 1 in which the barrel means includes a notch for holding a portion of each of the plurality of elastic members, and the trigger means includes a movable trigger, a portion of which extends downwardly beneath the receiver means.

3. The apparatus of claim 2 in which the movable stud means comprises a plurality of pivotable studs, each of which includes an upper arm for holding another portion of each elastic member and a roller arm disposed on the bolt means, and each stud pivots in response to action of the tensioned elastic member held thereon to release the tension elastic members.

4. The apparatus of claim 3 in which the bolt means includes a sliding member having a forward end, said sliding member disposed beneath the studs and movable in a first direction in response to movement of the trigger means and movable from beneath each stud in response to movement of the trigger means to sequentially allow each stud to pivot downwardly and to thereby release each tensioned elastic member.

5. The apparatus of claim 4 in which the movable means includes a pin extending outwardly from the receiver means for moving the bolt means in a second direction to pivot the studs upwardly for holding the elastic members.

6. The apparatus of claim 5 in which the bolt means further includes a strap secured to the sliding member at its front end and extending to the trigger means for controlling the movement of the bolt means in response to movement of the trigger means.

7. The apparatus of claim 6 in which the trigger means includes a trigger housing through which the strap secured to the sliding member extends.

8. The apparatus of claim 7 in which the trigger means includes a trigger spur disposed within the trigger housing and secured to the trigger and engaging and moving the strap in response to movement of the trigger means.

9. The apparatus of claim 8 in which the trigger means further includes a pin extending through the trigger means and disposed within the trigger housing for pivoting the trigger to engage the trigger spur and the strap when the trigger is moved in a first direction.

10. The apparatus of claim 9 in which the trigger means further includes a slot in which the trigger moves.

11. The apparatus of claim 10 in which the trigger means further includes a spring secured to the trigger beneath the trigger pin and exteriorally of the trigger housing to bias the trigger to allow the trigger to pivot as the trigger moves in a first direction and to move the trigger in a second direction in the slot in response to a release of the trigger means from movement thereof the first direction.

* * * * *